United States Patent [19]

Castine, Jr.

[11] 4,072,492
[45] Feb. 7, 1978

[54] GLASS BENDING LEHR WITH PRE-HEAT HOOD

[75] Inventor: William A. Castine, Jr., Jeannette, Pa.

[73] Assignee: PPG Industries, Inc., Pittsburgh, Pa.

[21] Appl. No.: 745,326

[22] Filed: Nov. 26, 1976

[51] Int. Cl.² ............................................. C03B 23/02
[52] U.S. Cl. ............................................. 65/107; 65/58; 65/104; 65/288; 65/103
[58] Field of Search ................ 65/104, 106, 107, 287, 65/288, 58, 103

[56] References Cited

U.S. PATENT DOCUMENTS

| | | |
|---|---|---|
| 2,794,300 | 6/1957 | Golightly ............................ 65/273 X |
| 3,257,187 | 6/1966 | Montgomery et al. ............. 65/58 X |
| 3,314,666 | 4/1967 | Gajardo ................................. 432/82 |
| 3,327,041 | 6/1967 | Clune et al. ............................. 13/20 |
| 3,367,764 | 2/1968 | Seymour ................................ 65/291 |
| 3,620,517 | 11/1971 | Keough ................................ 266/130 |

Primary Examiner—Arthur D. Kellogg
Attorney, Agent, or Firm—Dennis G. Millman

[57] ABSTRACT

Energy is conserved and the quality of the bent glass product improved by pre-heating gravity sag bending molds in an open-bottomed hood overlying a bending lehr. The hood traps otherwise wasted heat rising from the bending lehr.

10 Claims, 3 Drawing Figures

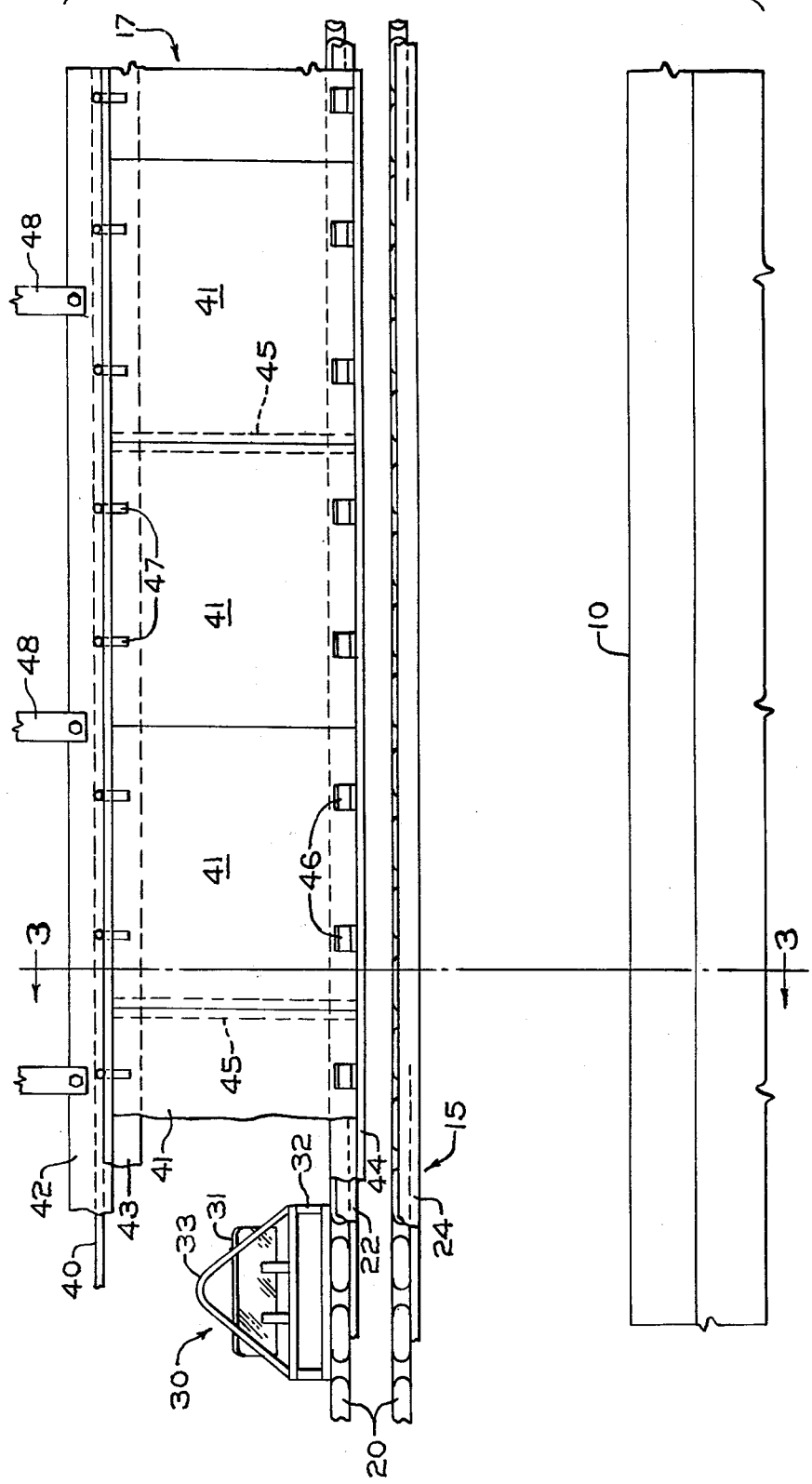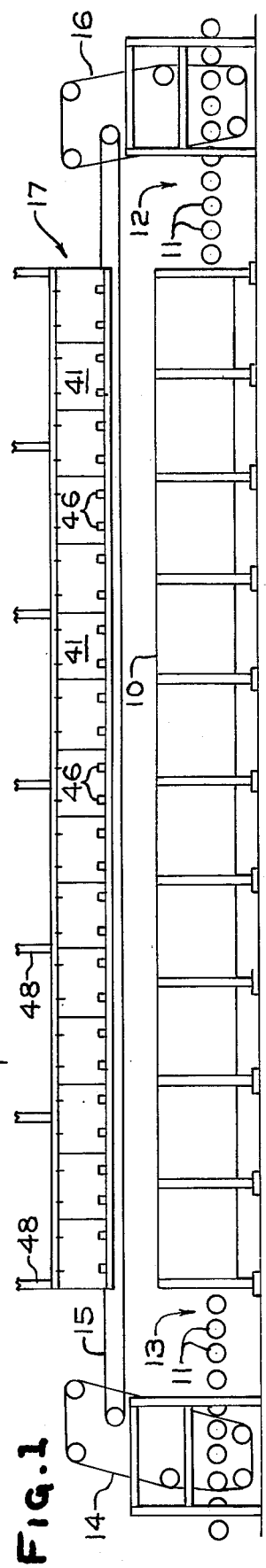

GLASS BENDING LEHR WITH PRE-HEAT HOOD

BACKGROUND OF THE INVENTION

The present invention relates to the art of bending glass sheets by a widely used technique known as gravity sag bending. In that technique, flat sheets of glass are placed upon bending molds having an outline of the curvature desired for the glass. The glass laden molds are pressed into a tunnel-like lehr wherein the glass sheets are heated until they sag to conform to the curvature of the bending mold. The process is usually carried out in a continuous manner, with glass being loaded onto a progression of molds at the entrance end of a horizontally elongated lehr, the bent glass being unloaded at the opposite end of the lehr, and the molds being continuously conveyed back to the entrance end of the lehr. A typical gravity sag bending opeation may be seen in U.S. Pat. No. 2,794,300 to Golightly.

Sag bending molds are usually made of metal, which somtimes causes problems in a bending operation. Metals have heat capacities considerably greater than glass, so that when a metal mold carrying a piece of glass enters the lehr, the metal absorbs more thermal energy and increases its temperature more slowly than the glass. At points of contact between the glass and the metal mold, this temperature difference causes heat to be conducted from the glass to the metal mold, thereby rendering the thermal condition of the glass non-uniform. Non-uniform heating can produce stresses within the glass which cause breakage of the glass while it is in the lehr or shortly after it has left the lehr, or they may create latent weaknesses in the bent product. It has been known in the art to attack this problem by preheating the bending molds in order to give the temperature of the mold a "headstart" before entering the lehr. This was accomplished by heating means, such as gas burners, located in or near the glass loading station at the entrance end of the lehr. It was also common practice in the art, when starting a new production run, to first send the cold molds through the lehr without glass at least once in order to preheat the molds so as to reduce the thermal differences beteen the metal molds and the glass sheets in the lehr which may arise later. For the sake of fuel efficiency, it would be desirable if both of these practices could be eliminated.

SUMMARY OF THE INVENTION

The present invention enables bending molds to be preheated by means of thermal energy which would otherwise be wasted. A hood having an open bottom is provided above the bending lehr to entrap heat rising from the lehr. The air temperature within the semi-enclosed space under the hood increases considerably over that of ambient air above the lehr due to an accumulation of heat within the hood. Bending molds being returned to the entrance end of the lehr are conveyed through the semi-enclosed space under the hood, whereby the molds are heated or have their cooling sufficiently slowed to eliminate, or at least substantially reduce, the need for preheating the molds.

THE DRAWINGS

FIG. 1 is an overall side view of a glass bending installation incorporating the mold preheating hood of the present invention.

FIG. 2 is an enlarged side view, partly broken away, of a portion of the installation of FIG. 1, showing details of the hood construction.

DETAILED DESCRIPTION

Figure 3:
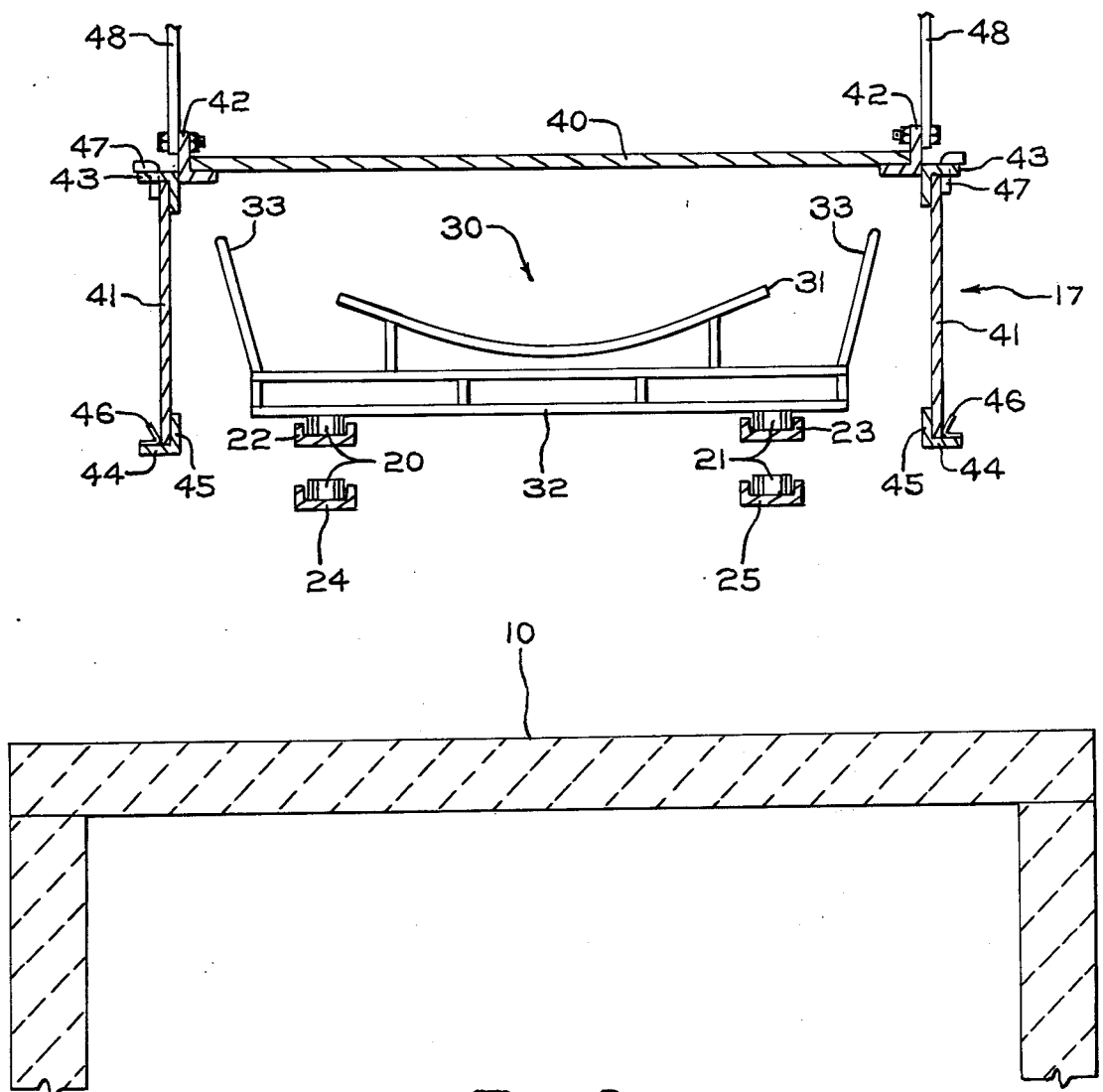
FIG. 3 is a cross-sectional view alone line 3—3 in FIG. 2.

A detailed description of a typical gravity sag bending lehr and mold conveying means associated therewith which may be used with the present invention is disclosed in U.S. Pat. No. 2,794,300 to Golightly, the disclosure of which is hereby incorporated by reference. Accordingly, only a general description of these prior art elements need be set forth here in order to obtain a full understanding of the present invention. In FIG. 1 there is shown a horizontally extending bending lehr 10 having a tunnel-like structure through which bending molds may be conveyed on a roller conveyor 11. At a loading zone, designated generally as 12, glass sheets are loaded onto bending molds, the molds and glass sheets pass through the furnace from right to left as depicted in FIG. 1, and the bent glass sheets are unloaded at an unloading zone designated generally as 13. The empty molds are lifted off of conveyor 11 by an elevator 14 and deposited onto a mold return conveyor 15 which carries the molds over the lehr back to the entrance end of the lehr where another elevator 16 lowers each mold onto conveyor 11. The improvement of the present invention comprises a hood 17 which overlies some, or all, of the lehr and at least partially encloses the path of the mold return conveyor 15 on the three sides.

Details of an illustrative embodiment of a return conveyor hood may be seen in FIGS. 2 and 3. The return conveyor 15 is shown to consist of a pair of endless chains 20 and 21, with the upper flights sliding in channels 22 and 23, respectively, and the return flights sliding in channels 24 and 25, respectively. The channels are held in place by a support structure (not shown) associated with the surrounding building structure. The chains extend slightly above the sides of the channels so as to support a bending mold 30, one of which is shown schematically in the drawings. The bending mold comprises a shaping surface or outline ring 31 with which glass sheets come into contact and which is provided with the curvature desired to be imparted to the glass. The bending mold may be provided with a frame 32 and handle-like means 33 for engaging the elevator means. A wide variety of bending mold designs are known to those in the art, and the present invention is not limited to any particular design.

The major elements of hood 17 are a number of top panels 40 and side panels 41. These panels may be of virtually any building material such as wood or corrugated sheet metal, but preferably they are both fire resistant and insulating. Examples of sheet materials which are particularly well suited for the purpose are "Marinite 36" and "Marinite XL" panels sold by Johns-Manville. "Marinite 36" is described by the manufacturer to be formed from asbestos, diatomaceous silica, and a hydrothermally produced inorganic binder. "Marinite XL" has a similar composition but without asbestos. Whatever material is used, the insulating value of the panels may be increased by adding a layer of fiber glass insulation or the like.

The manner in which the hood panels are suspended over the lehr will depend in large part upon the existing structure at a particular location. In the drawings, an illustrative example is shown where a steel skeleton, formed largely of lightweight angle irons, holds the hood panels and may be suspended from overhead structural elements of the building. A pair of elongated angle irons 42, which extend parallel to the length of the lehr, hold the top panels 40. Another pair of angle irons 43 and 44 extending along each side of the hood are adapted to receive the side panels 41. Angle iron 43 is joined to angle iron 44 by a plurality of vertical crosspieces 45. The bottom edge of each side panel 41 is loosely retained against angle iron 44 by a pair of clips 46. Each clip has an upstanding portion which is angled outwardly to permit the side panels 41 to be tilted out from removal. The upper edge of each side panel 41 is retained against angle iron 43 by means of one or more (two are shown) pins 47 which are inserted through bores in a horizontal leg of angle iron 43. By removing pins 47, the side panels may be readily removed to provide easy access to the interior of the hood for maintenance to the mold return conveyor 15 or other purposes. The entire hood assembly is hung from a plurality of hanger straps 48.

FIG. 1 shows the hood 17 overlying the entire length of lehr 10. While such an arrangement would optimize the preheating effect imparted to the bending molds, significant improvements may be obtained with hoods that cover a considerably smaller portion of the lehr. The dimensions of the hood in the transverse and vertical directions are also subject to some variation. Generally, it is desirable for the hood to be designed to completely enclose the bending mold on the top and sides during at least a portion of its passage along the return conveyor and to maximize the amount of waste heat trapped thereon. But certain limitations as to the size of the hood may be encountered in some cases. A hood that envelopes the lehr to such an extent that it tends to insulate the lehr may be undesirable if it causes the temperature of the cooler zones in the lehr to rise without control. Retaining too much heat may lead to uncomfortably high temperatures for workers in the vicinity and may also cause conveyor lubrication to break down. Therefore, it is preferred that the hood be constructed so as to leave an escape route for excess heat. In the embodiment shown in the drawings, this is accomplished by spacing the bottom edges of the side walls of the hood a substantial distance above the top of the lehr, for example, about 3 feet (about 1 meter) for a hood about 3 feet (about 1 meter) high and having approximately the same width as the lehr. Excess heated air may thereby flow out from under the hood by passing through the gap between the side walls and the lehr. An alternate way to prevent overheating the hood is to provide vent holes in the top of the hood, such as by leaving gaps between adjacent top panels at selected locations or by omitting a few top panels.

EXAMPLE I

In a short wooden experimental hood 4 feet (1.2 meters) long, 3 feet (0.9 meter) high, and 8 feet 7 inches (2.6 meters) wide (approximately the full width of the lehr), and located 3 feet (0.9 meters) above the lehr, temperatures inside the hood and outside the hood close to the side wall of the hood were measured periodically over an eight hour period. The mesurements began upon start-up of the lehr with the following results:

| Time After Start-Up (hrs.) | 0 | 2 | 3 | 5 | 6 | 7 | 8 |
|---|---|---|---|---|---|---|---|
| Inside | 157° F. (69° C.) | 173° F. (78° C.) | 180° F. (82° C.) | 183° F. (84° C.) | 185° F. (85° C.) | 180° F. (82° C.) | 177° F. (81° C.) |
| Outside | 127° F. (53° C.) | 134° F. (57° C.) | 135° F. (57° C.) | 139° F. (59° C.) | 141° F. (61° c.) | 140° F. (60° C.) | 134° F. (57° C.) |
| Difference | 30° F. (16° C.) | 39° F. (21° C.) | 45° F. (25° C.) | 44° F. (25° C.) | 44° F. (24° C.) | 40° F. (22° C.) | 43° F. (24° C.) |

It can be seen that even with such a de minimis hood the temperature inside the hood averaged about 40° F. (22° C.) greater than the outside. A longer hood would be expected to exhibit a greater temperature difference. The hood in this example was located over a zone of the lehr within which the temperature was measured as 920° F. (493° C.) 4½ hours after start-up.

EXAMPLE II

In two substantially identical glass bending lines having the general layout shown in FIG. 1, cold bending molds were placed onto the mold return conveyors at the unloading ends of the respective lehrs at the start of production runs. One line had no hood, and the mold passed over the lehr through the ambient hot air rising from the lehr. The other line was provided with a hood 175 feet (53 meters) long, 3 feet (0.9 meters) deep, and 9 feet (2.7 meters) wide constructed substantially in accordance with the preferred embodiment disclosed hereinabove. The panels were ¾ inch (19 millimeters) thick "Marinite 26". The panels covered virtually the entire length of the lehr. The temperatures of the bending molds were taken at both ends of the mold return conveyor. On the line without a hood, mold temperatures rose from 80° F. (27° C.) to 110° F. (43° C.) an increase of 30° F. (16° C.). On the line with the hood, mold temperatures rose from 80° F. (27° C.) to 130° F. (54° C.), an increase of 50° F. (27° C.). Thus, the heat gain with a hood was improved by 67 percent.

EXAMPLE III

Preheating of bending molds after the initial pass through the lehr actually consists of retarding the loss of heat from the molds. Typically a bending mold is deposited onto the mold return conveyor at a temperature of about 250° F. (121° C.) and, without a hood, drops to about 200° F. (93° C.) when it arrives at the loading station. Ambient air temperature above the lehr typically averages about 135° F. (57° C.). By calculation, it may be estimated that by raising the air temperature to 200° F. (93° C.) along the mold return path, the temperature of the molds would drop to only 225° F. (107° C.). In actual practice, comparing the same two production lines described in Example II — one line with a hood, one line without — the mold temperatures were found to fall as follows:

|  | Placed on Return Conveyor | Taken off Return Conveyor | Temperature loss |
|---|---|---|---|
| Without Hood | 240° F. | 195° F. | 45° F. |

-continued

|  | Placed on Return Conveyor | Taken off Return Conveyor | Temperature loss |
|---|---|---|---|
| With Hood | (116° C.) 205° F. (96° C.) | (91° C.) 190° F. (88° C.) | (25° C.) 15° F. (8° C.) |

Temperature loss on the line with a hood was one-third of that for the line without a hood.

The present invention may also find utility in connection with other glass bending processes, such as the vertical press bending process (e.g., see U.S. Pat. No. 3,367,764), wherein glass sheets are supported by metal tongs which are recycled through a furnace. A hood covering the return conveyor for the tongs would advantageously yield higher tong temperatures at the furnace entrance.

A hood overlying a heating chamber in accordance with the present invention can also be utilized to conserve energy by using the trapped waste heat to heat process lines such as water or air. Water pipes or air ducts may be arranged within the hood so that their contents are warmed by heat exchange through the pipe or duct walls as they pass through the hood. If the hot air trapped by the hood is free of combustion products, it may be drawn off directly for use in a forced air heating system.

The invention is not limited to the specific examples which have been disclosed herein for the purpose of illustration. Modifications and variations which are known to those of skill in the art may be resorted to without departing from the spirit and scope of the invention as defined by the appended claims.

I claim:

1. A method of shaping glass sheets including the steps of supporting a glass sheet on support means comprised of a material having a greater heat capacity than glass, conveying said support means and said glass sheet into a horizontally elongated heating chamber wherein the entire glass sheet is heated to a temperature sufficient to soften the glass sheet as it passes from an entrance end of the heating chamber to a longitudinally spaced exit end of the heating chamber, shaping the glass sheet while in the softened condition, removing the glass sheet from said support means, and conveying said support means back to the entrance end of the heating chamber so as to support a subsequent sheet of glass through the heating and shaping steps, wherein the improvement comprises:

trapping waste heat escaping from the heating chamber in a partially closed hood structure having a top, sides, and an open bottom spaced from and overlying at least a portion of said heating chamber so that the air within said hood becomes heated above ambient temperatures, and passing said support means through the heated air within said hood during the step of conveying the support means back to the entrance end of the heating chamber.

2. The method of claim 1 wherein the temperature within the hood is maintained at least about 40° F. above ambient temperatures in the immediate vicinity of the hood.

3. The method of claim 1 wherein the step of shaping the glass sheets is carried out by gravity sag bending and the support means comprises a contoured sag bending mold.

4. An apparatus for shaping glass sheets comprising a horizontally elongated heating chamber having longitudinally spaced inlet and outlet openings and means to heat sheets of glass therein to an overall softened condition, support means for supporting a sheet of glass as it passes through said heating chamber, conveyor means for passing said support means through the heating chamber from the inlet opening to the outlet opening, second conveyor means overlying the heating chamber for returning said support means to the inlet end of the heating chamber, and hood means spaced from the top of said heating chamber and having a top, sides, and an open bottom partially enclosing said second conveyor means and oriented to entrap hot air rising from the heating chamber.

5. The apparatus of claim 4 wherein the sides of the hood comprise a pair of longitudinally extending walls flanking and extending downwardly from the top of the hood, the downward extent of said walls being spaced above the top of the heating chamber.

6. The apparatus of claim 5 wherein the downward extent of the side walls of the hood is about midway between the top of the hood and the top of the heating chamber.

7. The apparatus of claim 4 wherein the support means comprises a gravity sag bending contour mold.

8. The apparatus of claim 4 wherein the width of the hood is coextensive with the width of the heating chamber.

9. The apparatus of claim 4 wherein the length of the hood is coextensive with the length of the heating chamber.

10. The apparatus of claim 4 wherein the hood is formed by a plurality of panels releasably retained on a frame suspended above the heating chamber.

* * * * *